(12) United States Patent
Koskinen et al.

(10) Patent No.: US 9,329,662 B2
(45) Date of Patent: May 3, 2016

(54) ENHANCED POWER SAVING OPTIMIZED CONFIGURATION HANDLING

(71) Applicant: Nokia Corporation, Espoo (FI)

(72) Inventors: Jussi-Pekka Koskinen, Oulu (FI); Lars Dalsgaard, Oulu (FI); Ilkka Keskitalo, Oulu (FI); Jorma Kaikkonen, Oulu (FI); Jarkko Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 258 days.

(21) Appl. No.: 14/012,295

(22) Filed: Aug. 28, 2013

(65) Prior Publication Data

US 2014/0068307 A1    Mar. 6, 2014

Related U.S. Application Data (60) Provisional application No. 61/694,731, filed on Aug. 29, 2012.

(51) Int. Cl.
*G06F 1/32* (2006.01)
*H04W 52/02* (2009.01)

(52) U.S. Cl.
CPC .............. *G06F 1/324* (2013.01); *G06F 1/3209* (2013.01); *H04W 52/0209* (2013.01); *H04W 52/0216* (2013.01); *H04W 52/0251* (2013.01); *Y02B 60/50* (2013.01)

(58) Field of Classification Search
CPC .................................................. G06F 1/3203
USPC ........................................................ 713/323
See application file for complete search history.

(56) References Cited

U.S. PATENT DOCUMENTS

| | | | |
|---|---|---|---|
| 6,029,074 A * | 2/2000 | Irvin | 455/571 |
| 2004/0180701 A1* | 9/2004 | Livet et al. | 455/574 |
| 2006/0094478 A1 | 5/2006 | Kim et al. | |
| 2010/0208660 A1* | 8/2010 | Ji | 370/328 |
| 2011/0211466 A1* | 9/2011 | Kazmi | 370/252 |
| 2012/0322515 A1* | 12/2012 | Hwang et al. | 455/574 |
| 2013/0148535 A1* | 6/2013 | Baghel et al. | 370/252 |
| 2014/0038607 A1* | 2/2014 | Makharia et al. | 455/436 |

FOREIGN PATENT DOCUMENTS

WO    2006/099134 A2    9/2006

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3GPP TS 36.300, v10.7.0, Mar. 2012, pp. 1-194.

(Continued)

*Primary Examiner* — Suresh Suryawanshi
(74) *Attorney, Agent, or Firm* — Squire Patton Boggs (US) LLP (57) ABSTRACT

Methods and apparatus, including computer program products, are provided for power savings. In one aspect there is provided a method. The method may include sending, by a user equipment, an indication to a network, wherein the indication represents whether there is a preference for power savings at the user equipment; and performing, at the user equipment when the indication is sent, one or more actions to implement power savings at the user equipment. Related apparatus, systems, methods, and articles are also described.

18 Claims, 4 Drawing Sheets

(56) References Cited

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331, v10.5.0, Mar. 2012, pp. 1-302.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321, v10.5.0, Mar. 2012, pp. 1-54.

"3rd Generation Partnership Project; Technical Specification Group Radio Access Network; Evolved Universal Terrestrial Radio Access (E-UTRA); LTE Physical Layer; General Description (Release 11)", 3GPP TS 36.201, v11.1.0, Dec. 2012, pp. 1-13.

"3rd Generation Partnership Project; Technical Specification Group Radio Access Network; Evolved Universal Terrestrial Radio Access (E-UTRA); Physical Channels and Modulation (Release 11)", 3GPP TS 36.211, v11.2.0, Feb. 2013, pp. 1-109.

"3rd Generation Partnership Project; Technical Specification Group Radio Access Network; Evolved Universal Terrestrial Radio Access (E-UTRA); Multiplexing and Channel Coding (Release 11)", 3GPP TS 36.212, v11.2.0, Feb. 2013, pp. 1-82.

"3rd Generation Partnership Project; Technical Specification Group Radio Access Network; Evolved Universal Terrestrial Radio Access (E-UTRA); Physical Layer Procedures (Release 10)", 3GPP TS 36.213, v10.9.0, Feb. 2013, pp. 1-126.

"3rd Generation Partnership Project; Technical Specification Group Radio Access Network; Evolved Universal Terrestrial Radio Access (E-UTRA); Physical Layer; Measurements (Release 11)", 3GPP TS 36.214, v11.1.0, Dec. 2012, pp. 1-14.

"Performance With Power Vs. Performance Optimized Configurations", 3GPP TSG-RAN WG2 Meeting #78, R2-122515, Agenda item: 7.2.1, May 21-25, 2012, 5 pages.

"UE Assistance Information for UE Power Saving and Optimized Network Performance", 3GPP TSG-RAN WG2 Meeting #77bis, R2-121203, Agenda item: 7.2.1, Mar. 26-30, 2012, 4 pages.

International Search Report and Written Opinion received for corresponding Patent Cooperation Treaty Application No. PCT/FI2013/050553, dated Aug. 30, 2013, 14 pages.

"3rd Generation Partnership Project; Technical Specification Group Radio Access Network; Evolved Universal Terrestrial Radio Access (E-UTRA); Requirements for Support of Radio Resource Management (Release 11)", 3GPP TS 36.133, v11.0.0, Mar. 2012, pp. 1-652.

Office Action dated Jan. 29, 2016, issued in related U.S. Appl. No. 14/405,488.

Extended European Search Report dated Jan. 21, 2016, issued in corresponding EP Application No. 13800991.5.

Nokia Corporation: "Summary of Email discussion [77bis#25] LTE/EDDA: Assistance information", 3GPP Draft; R2-122512; 3GPP TSG-RAN WG2 Meeting #78, XP050607298; May 15, 2012 (21 pages).

Ericsson et al: "About DRX configuration and UE assistance", 3GPP Draft; R2-122587; 3GPP TSG-RAN WG2 #78, May 15, 2012 (7 pages).

* cited by examiner

ENHANCED POWER SAVING OPTIMIZED CONFIGURATION HANDLING

The subject matter described herein relates to wireless communications.

BACKGROUND

Networks and user equipment, such as smart phones and the like, are gradually changing the characteristics of mobile traffic. There are increasingly more and more applications at the user equipment requiring so-called always-on type of connections to a serving application in the network. This trend gives rise to a number of challenges both in the radio access network load as well as in the user equipment. For example, the network may have issues with signaling load and radio resource usage caused by a large number of connected user equipment or these user equipment changing state between connected and the more power/resource efficient idle mode. And, the user equipment including the so-called always-on applications may also generate traffic when unattended. For example, user equipment, such as a smart phone, may include an always-on application, such as a social networking application, a voice over internet protocol (IP) application, a location service application, and the like, may generate traffic even when not in active use. This so-called "background" traffic from these applications may include one of more packets (or bursts of packets) of relatively small size, which may be sent intermittently. This kind of background traffic may include polling messages between the application at the user equipment and a serving application in the network, keep-alive messages between the application at the user equipment and a serving application in the network, status updates between the application at the user equipment and a serving application in the network, update queries between the application at the user equipment and a serving application in the network, or anything that the application (or operating systems hosting the application) may send to the network when the user equipment hosting the application is not actively being used.

SUMMARY

Methods and apparatus, including computer program products, are provided for power savings. In one aspect there is provided a method. The method may include sending, by a user equipment, an indication to a network, wherein the indication represents whether there is a preference for power savings at the user equipment; and performing, at the user equipment when the indication is sent, one or more actions to implement power savings at the user equipment.

In another aspect, there is provided an apparatus including at least one processor and at least one memory including code which when executed by the at least one processor causes operations which may include sending an indication to a network, wherein the indication represents whether there is a preference for power savings at the user equipment; and performing, when the indication is sent, one or more actions to implement power savings at the user equipment.

In another aspect, there is provided a computer-readable storage medium including code which when executed by at least one processor causes operations which may include sending, by a user equipment, an indication to a network, wherein the indication represents whether there is a preference for power savings at the user equipment; and performing, at the user equipment when the indication is sent, one or more actions to implement power savings at the user equipment.

In some example embodiments, one of more variations may be made as well as described in the detailed description below and/or as described in the following features. The one or more actions may include at least one of the following: deactivating a secondary cell associated with a carrier aggregation configuration; releasing, by the user equipment, a secondary cell associated with the carrier aggregation configuration; releasing a physical uplink control channel configuration; terminating a timing advance timer before expiration of the timing advance timer; configuring a longer discontinuous receive cycle; configuring a longer measurement cycle; releasing a connection; releasing a radio resource control connection; inhibiting one or more measurements performed by the user equipment; inhibiting one or more inter-frequency measurements while continuing one or more intra-frequency measurements; inhibiting evaluation by the user equipment of one or more measurement events; inhibiting the user equipment from sending one or more measurement reports to the network; removing at the user equipment one or more measurement objects; deactivating at the user equipment one or more measurement objects; or performing by the user equipment one or more measurements less frequently when compared the user equipment not preferring power savings. The one or more actions at the user equipment may be performed at the user equipment, when the indication is sent. The network may include a wireless network including a base station. The one or more actions may be performed, when the indication is sent, without the user equipment being signaled by the network to perform the one or more actions. The one or more actions may include configuring a first time for at least one of a cell search, a hand over delay, and a hand over interruption, wherein the first time is greater than a second time configured for the at least one of the cell search, the hand over delay, and the hand over interruption when there is no preference for the power savings at the user equipment. A configuration for the one or more actions may be received from the network before the indication is sent.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

In some example embodiments, opportunities may be sought to place the user equipment in an idle state by moving the user equipment to an idle state soon after sending/receiving data burst(s), configuring the user equipment with appropriate discontinuous receive (DRX) parameters to allow sufficient sleep times at the user equipment, and the like. In order to optimize the user experience and to assist the network (e.g., a node in the network, such as a base station and the like) in configuring connected mode parameters and connection release handling, the user equipment may be configured to send assistance information to the network. Moreover, this assistance information may, in some example embodiments, include a user equipment preference for power optimization. This preference may, in some example embodiments, be configured as a value, such as a single bit value representative of true or false (e.g., true may represent a preference for power optimization at the user equipment). When this single bit is sent by the user equipment to the network, the user equipment may set the bit (e.g., to true or false) in accordance with the user equipment preference for power saving.

In some example embodiments, when the user equipment indicates a preference for power savings as part of the assistance information sent to the network, the user equipment may perform power savings options (which are described further below) at the user equipment. Moreover, these power savings options may be performed, without the network signaling the user equipment to initiate the power savings option.

In some example embodiments, the power savings measures which may be performed at the user equipment may include one or more of the following: a secondary cell used to provide carrier aggregation (e.g., in accordance with 3GPP TS 36.321, V10.5.0 and the like) may be deactivated, when active; the user equipment may release, when active, the secondary cell so that only the primary cell is active without the carrier aggregation configuration; the Physical Uplink Control Channel (e.g., PUCCH) configuration may be released, when configured; a timing advance timer (TAT) may be terminated (e.g., when this user preference indication is sent, or set, the TAT timer times out without waiting for the TAT timer to count down to expiration), which may be followed by a release of the PUCCH; a connection, such as the radio resource control (RRC) connection may be released; the user equipment may not perform certain measurements; the user equipment may only perform intra-frequency measurements; the user equipment may not evaluate certain measurement events; the user equipment may not send measurement reports to the network; the user equipment may remove or deactivate a measurement object; the user equipment may perform certain measurement configurations under relaxed performance; and any other configuration adjustment may be implemented at the user equipment to allow power saving opportunities. Restricted measurements or measurement reporting may be applied on certain carrier frequencies, cells, radio access systems (or radio access technologies, RATs) or public land mobile networks (PLMNs).

In some example embodiments, the network may configure one or more of these power saving options to be performed by the user equipment after the user equipment has sent the power saving preference indication. Moreover, one or more of these power saving options (implemented after the user equipment has sent the power saving preference indication) may be specified by a standard as well.

Before providing additional examples regarding the power saving options, the following provides an example of a system framework in which some of the example embodiments described herein may be implemented.

Figure 1:
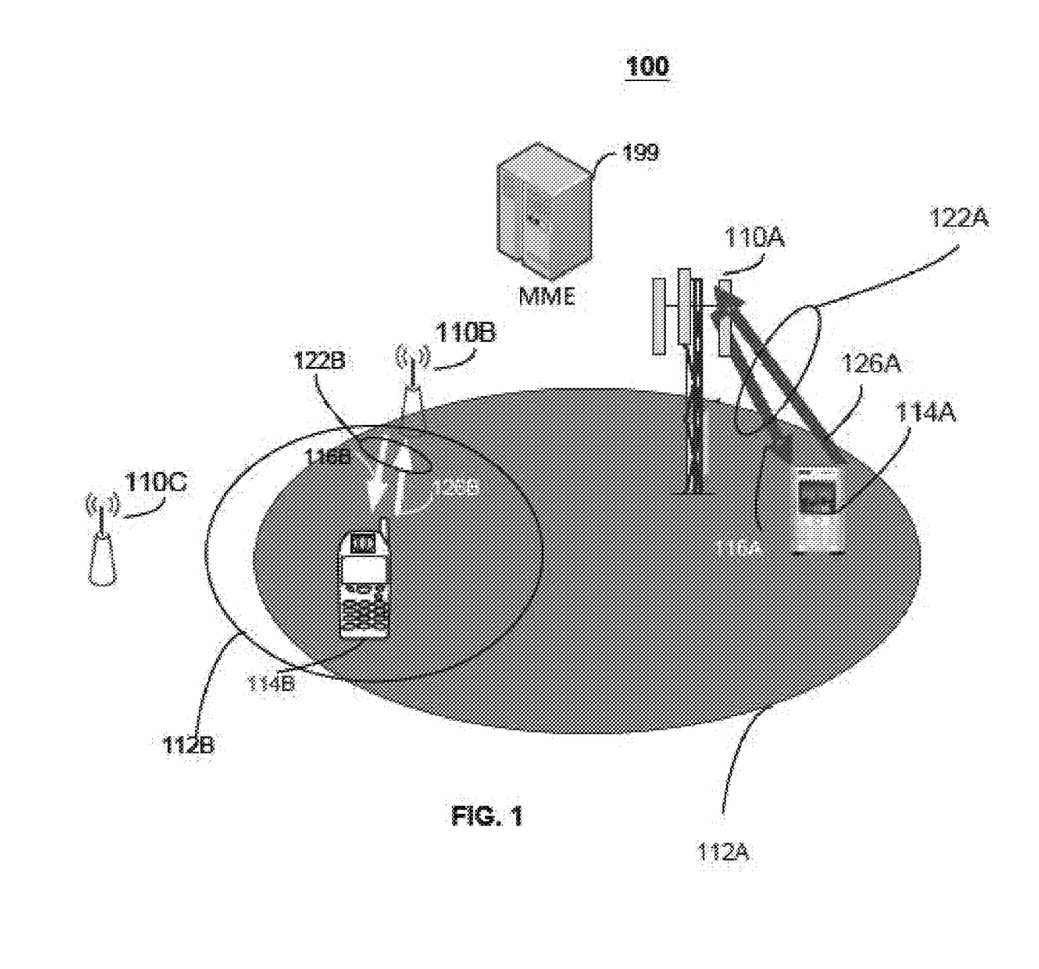
FIG. 1 depicts an example of a system configured to allow a user equipment to indicate a preference for power savings, in accordance with some example embodiments.

FIG. 1 depicts a system 100 according to some example embodiments. System 100 may include one or more user equipment, such as user equipment 114A-B, one or more access points, such as base stations 110A-C. In some example embodiments, base station 110A may serve a cell, such as macrocell 112A, and base station 110B may serve a small cell, such as a picocell or a femtocell 112B, although base station 110B may serve other types of cells as well. Moreover, base stations may have wired and/or wireless backhaul links to other network nodes, such as a mobility management entity 199, other base stations, a radio network controller, a core network, a serving gateway, and the like.

In some example embodiments, user equipment 114A-B may be implemented as a user equipment and/or a stationary device. The user equipment 114A-B are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some example embodiments, user equipment may include a processor, a computer-readable storage medium (e.g., memory, storage, and the like), a radio access mechanism, and/or a user interface. For example, the user equipment may take the form of a wireless telephone, a computer with a wireless connection to a network, or the like.

In some example embodiments, the user equipment 114A-B may be implemented as multi-mode user devices configured to operate using a plurality of radio access technologies. For example, user equipment 114B may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. Moreover, the user equipment 114B may be configured to have established connections to access points using a plurality of the radio access technologies.

The base stations 110A-C may, in some example embodiments, be implemented as an evolved Node B (eNB) type base station, although other types of radio access points may be implemented as well. When the evolved Node B (eNB) type base station is used, the base stations, such as base station 110A, may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base stations 110A may also be configured to serve macrocell 112A using a WLAN technology, such as WiFi (e.g., the IEEE 802.11 series of standards), and any other radio access technology capable of serving macrocell 112A.

In some example embodiments, the system 100 may include access links, such as links 122A-B. The access links 122A may include a downlink 116A for transmitting to the user equipment 114A and an uplink 126A for transmitting from user equipment 114A to the base station 110A. The downlink 116A may comprise a modulated radio frequency carrying information, such as user data, radio resource control (RRC) messages, location information, and the like, to the user equipment 114A, and the uplink 126A may comprise a modulated radio frequency carrying information, such as user data, RRC messages, location information, measurement reports associated with handovers, and the like, from the user equipment 114A to base station 110A. Access links 122B may include downlink 116B for transmitting from the base station 110B to user equipment 114B, and uplink 126B for transmitting from user equipment 114B to the base station 110B. Although FIG. 1 depicts access links 122B between user equipment 114B and base station 110B, user equipment 114B may have access links to other devices, such as base station 110A, base station 110C, and the like.

The downlink 116A and uplinks 126A may, in some example embodiments, each represent a radio frequency (RF) signal. The RF signal may, as noted above, include data, such as voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies. Furthermore, the downlink 116B and uplink 126B may be configured using standards and/or technologies similar to those noted with respect to downlink 116A and uplink 126A, although downlink 116B and uplink 126B may use a different standards or technologies as well, such as WiFi, WiBro, BT-LE, and/or another other wireless technology. In addition, each access link may be unidirectional or bidirectional.

The base station 110B may, in some example embodiments, be implemented to serve a small cell, such as femtocell 112B. Moreover, base station 110B may be configured to operate with a plurality of radio access technologies including LTE, WiFi, BT-LE, and/or any other wireless local area network standards. In some example embodiments, the base station 110B may be implemented as a home evolved node B (HeNB) base station serving femtocell 112B, which covers a structure or a predefined area, such as a home, an office building, and the like, although wireless access point 110B may also be implemented as a cellular base station as well.

Although FIG. 1 depicts a specific quantity and configuration of base stations, cells, and user equipment, other quantities and configurations may be implemented as well.

Figure 2:
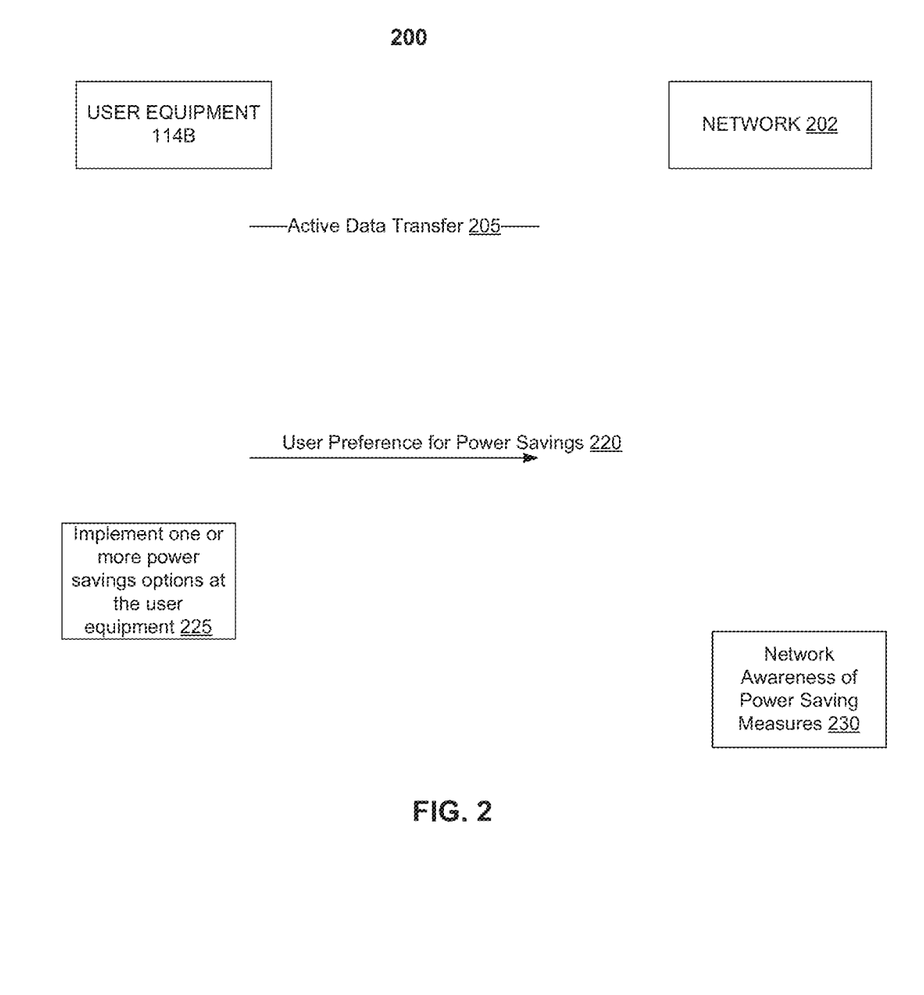
FIG. 2 depicts an example of a process configured to allow a user equipment to indicate a preference for power savings, in accordance with some example embodiments.

FIG. 2 depicts an example of a process 200 in which a user equipment implements one or more power savings options at the user equipment, in accordance with some example embodiments.

At 205, the user equipment 114B may be communicating data with the network 202, in accordance with some example embodiments. For example, the user equipment 114B may have connections established to the network (e.g., one or more access points, base stations, and the like) to transfer data with a primary cell (PCell) and/or a secondary cell (SCell) configured in accordance with carrier aggregation to provide an overall aggregate bandwidth equivalent to the sum of the bandwidths to each cell, although other types of connections may be established as well (including connection(s) not implemented in accordance with carrier aggregation).

At 220, the user equipment 114B (and/or an application therein) may send to the network 202 an indication representative of whether there is a preference for power savings options at the user equipment, in accordance with some example embodiments. For example, this indication may be sent as a true indication (which may represent that the user equipment prefers power savings options at the user equipment) or as a false indication (which may represent that the user equipment does not prefer power savings options at the user equipment). In this example, the indication may be set as a value, such as a one bit value to indicate true or false, and this indication may be sent as part of the assistance information sent by the user equipment to the network, although the preference for power savings may be sent to the user equipment in other formats and ways as well.

At 225, the user equipment may implement the one or more power saving options (also referred to as measures) at the user equipment, in accordance with some example embodiments. Moreover, when the indication representative of a preference for power savings is sent to the network 202, the user equipment may autonomously (e.g., without signaling from the network) perform one or more of the power savings options. For example, after the user equipment 114B sends the indication at 220 (which represents a preference for power savings), the user equipment 114B may perform, without being signaled to do so by the network 202, one or more of the following power saving measures: the user equipment may deactivate a secondary cell used to provide carrier aggregation (e.g., in accordance with 3GPP TS 36.321, V10.5.0 and the like), when active; the user equipment may release, when active, the secondary cell so that only the primary cell is active without the carrier aggregation configuration; the PUCCH configuration may be released, when configured; a TAT may be terminated (e.g., when this user preference indication is sent, or set, the TAT timer times out without waiting for the TAT timer to count down to expiration), which may be followed by a release of the PUCCH; a connection, such as the radio resource control (RRC) connection may be released; and any other configuration adjustment may be implemented at the user equipment to allow power saving opportunities. For example, other power savings options may include switching to longer discontinuous receive cycle, a longer secondary cell, and/or a longer carrier frequency measurement periodicity. The longer options may, in some example embodiments, be configured by the network so that these longer values are used by the user equipment after the power saving indication has been sent. Restricted measurements or measurement reporting may be applied on certain carrier frequencies, cells, radio access systems (or radio access technologies, RATs) or public land mobile networks (PLMNs).

In some example embodiments, the user equipment 114B may, at 225, perform one or more power savings options as noted above alone or in combination with one or more of the following power savings options: not perform certain measurements; only perform intra-frequency measurements; not evaluate certain measurement events; not send measurement reports; remove or deactivate a measurement object; and/or perform certain measurement configurations under relaxed performance conditions.

To illustrate further, user equipment 114B may, at 225, relax measurement requirements as a power savings option by not performing certain measurements, such as inter-frequency or intra-frequency target cell selection measurements or having less frequent measurements periods. Moreover, the user equipment 114B may, at 225, relax measurement requirements as a power savings option by only performing intra-frequency measurements of target cells, allowing relaxed measurement accuracies, allowing less stringent search times for cell detection (e.g., cell selection or reselection), allowing longer handover delays or interruption times, and the like. Furthermore, the user equipment 114B may, at 225, not evaluate one or more measurement events, such as events related to inter-frequency reporting. For example, mobility events (such as A or B events specified in 3GPP TS 36.331) for inter-frequency or inter-RAT channels may not be evaluated. The user equipment 114B may, at 225, not send measurement reports for certain events, such as A-events for inter-frequency mobility or B-events for inter-RAT mobility specified for example in 3GPP TS 36.331, or reduce the periodicity of the report being sent to the network. In addition, user equipment 114B may, at 225, remove and/or deactivate a measurement object (e.g., a file) at the user equipment 114B. And, the user equipment 114B may, at 225, perform certain measurements under relaxed performance constraints, when compared to modes in which there is not preference for power savings. For example, the user equipment 114B may, at 225, perform inter-frequency measurements less frequently, when compared to modes in which there is not a preference for power savings.

The network 202 may, as noted, configure, in some example embodiments, one or more of these power saving options (also referred to as actions and/or measures) to be performed by the user equipment 114B before the user equipment has sent the power saving preference indication. For example, the network 202 may configure one or more of these power saving options by specifying which of these power savings options can be performed by the user equipment and/or provide configuration information for the specified options. In addition, one or more of these power saving options (initiated or implemented after the user equipment has sent power saving preference indication) may, as noted, be specified by a standard as well. In some example embodiments, the secondary cell deactivation may be performed in accordance with 3GPP TS 36.321, secondary cell release and RRC connection release may be performed in accordance with 3GPP TS 36.331, although other standards and mechanisms may be used as well. For example, the reduced performance requirements for the user equipment, when power saving preference has been indicated, may be defined by specifying reduced performance requirements for user equipment in a specification, such as TS 36.133, for measurements, cell detection, and so forth.

At 230, the network may reallocate some of the resource made available by the user equipment at 225, in accordance with some example embodiments. For example, the network may re-allocate a cell or connection released by the user equipment.

Figure 3:
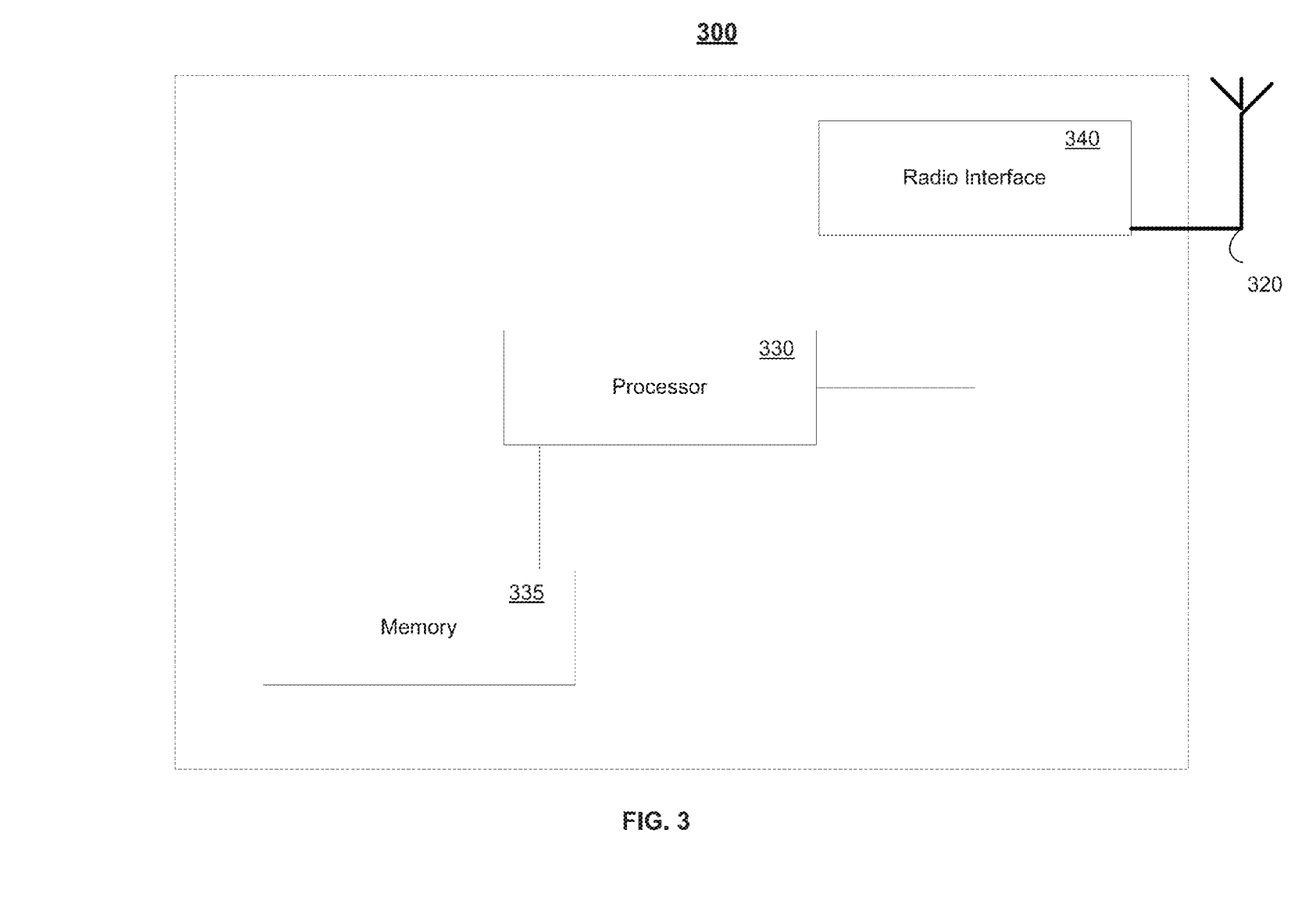
FIG. 3 depicts an example of an access point, in accordance with some example embodiments.

FIG. 3 depicts an example implementation of an access point 300, which may be implemented at devices 110A or 110B. The access point may include one or more antennas 320 configured to transmit via a downlink and configured to receive uplinks via the antenna(s) 320. The access point may further include a plurality of radio interfaces 340 coupled to the antenna 320. The radio interfaces may correspond to a plurality of radio access technologies including one or more of LTE, WLAN, Bluetooth, BT-LE, NFC, radio frequency identifier (RFID), ultrawideband (UWB), ZigBee, and the like. The access point may further include at least one processor, such as processor 330, for controlling the access point 300 and for accessing and executing program code stored in memory 335. In some example embodiments, the memory 335 includes code, which when executed by at least one processor causes one or more of the operations described herein with respect to an access point (e.g., receiving the power saving preference from the user equipment, re-allocating network resources released by the user equipment, and the like). The radio interface 340 may further include other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink).

Figure 4:
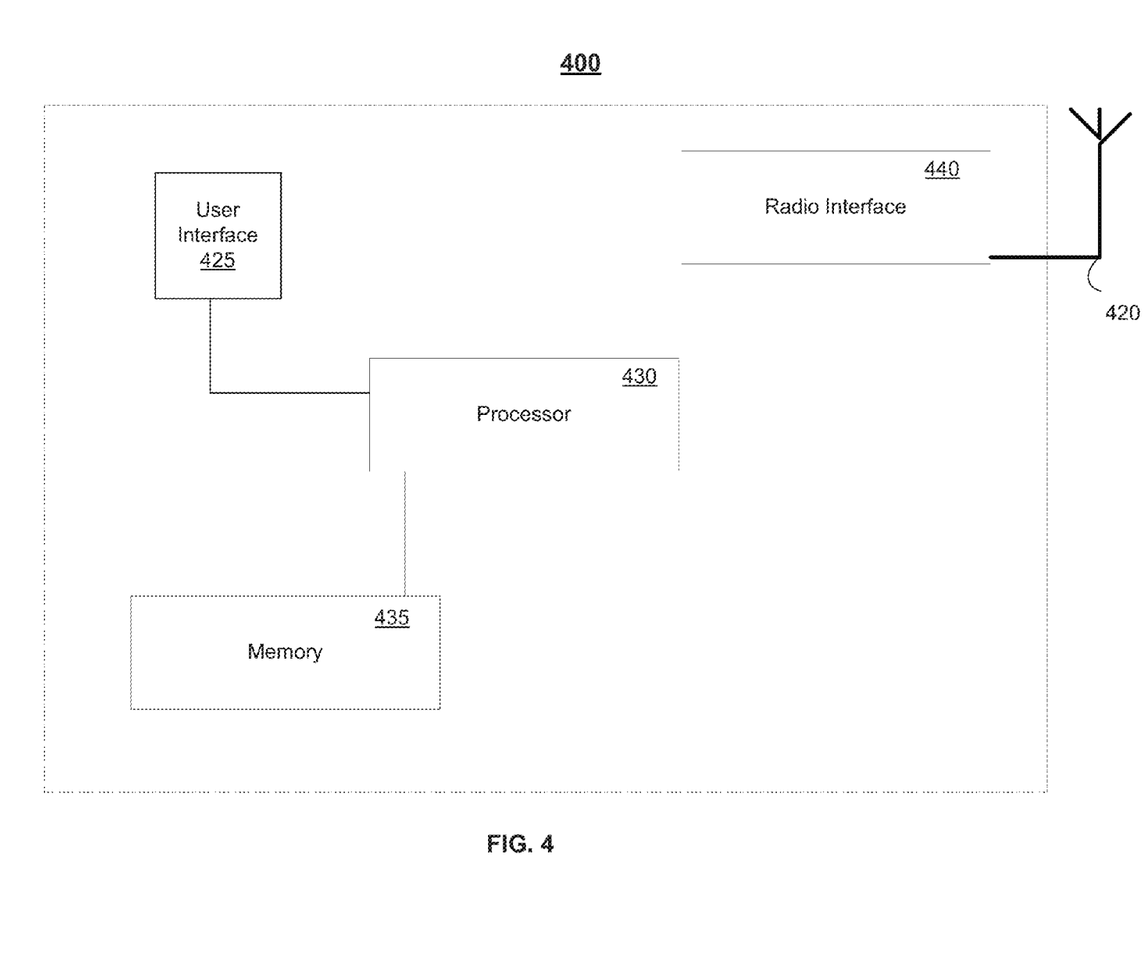
FIG. 4 depicts an example of a radio, in accordance with some example embodiments.

FIG. 4 depicts a block diagram of a radio, such as a user equipment 400. The user equipment 400 may include an antenna 420 for receiving a downlink and transmitting via an uplink. The user equipment 400 may also include a radio interface 440 coupled to the antenna 420. The radio interface may correspond to a plurality of radio access technologies including one or more of LTE, WLAN, Bluetooth, BT-LE, NFC, RFID, UWB, ZigBee, and the like. The radio interface 440 may include other components, such as filters, converters (e.g., digital-to-analog converters and the like), symbol demappers, signal shaping components, an Inverse Fast Fourier Transform (IFFT) module, and the like, to process symbols, such as OFDMA symbols, carried by a downlink or an uplink. The user equipment 400 may further include a user interface 425, at least one processor, such as processor 430, for controlling user equipment 400 and for accessing and executing program code stored in memory 435. In some example embodiments, the memory 435 includes code, which when executed by at least one processor causes one or more of the operations described herein with respect to user equipment, process 200, and the like.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
sending, by a user equipment, an indication to a network, wherein the indication represents whether there is a preference for power savings at the user equipment; and
performing, at the user equipment when the indication is sent, one or more actions to implement power savings at the user equipment;
wherein the one or more actions include at least one of the following: deactivating a secondary cell associated with a carrier aggregation configuration; releasing, by the user equipment, a secondary cell associated with the carrier aggregation configuration; releasing a physical up 1 link control channel configuration; terminating a timing advance timer before expiration of the timing advance timer; releasing a connection; configuring a longer discontinuous receive cycle; configuring a longer measurement cycle; releasing a radio resource control connection; inhibiting one or more measurements performed by the user equipment; inhibiting one or more inter-frequency measurements while continuing one or more intra-frequency measurements; inhibiting evaluation by the user equipment of one or more measurement events; inhibiting the user equipment from sending one or more measurement reports to the network; removing at the user equipment one or more measurement objects; deactivating at the user equipment one or more measurement objects; or performing by the user equipment one or more measurements less frequently when compared the user equipment not preferring power savings.

2. A method as in claims 1, wherein the one or more actions at the user equipment are performed at the user equipment, when the indication is sent.

3. A method as in claims 1, wherein the network comprises a wireless network including a base station.

4. A method as in claims 2, wherein the one or more actions are performed, when the indication is sent, without the user equipment being signaled by the network to perform the one or more actions.

5. A method as in claims 1, wherein the one or more actions include configuring a first time for at least one of a cell search, a hand over delay, and a hand over interruption, wherein the first time is greater than a second time configured for the at least one of the cell search, the hand over delay, and the hand over interruption when there is no preference for the power savings at the user equipment.

6. A method as in claims 1 further comprising:
receiving, from the network before the indication is sent, a configuration for the one or more actions.

7. An apparatus comprising:
at least one processor; and
at least one memory including computer program code for one or more programs, the at least one processor, the at least one memory, and the computer program code configured to cause the apparatus to at least:
send an indication to a network, wherein the indication represents whether there is a preference for power savings at the user equipment; and
perform, when the indication is sent, one or more actions to implement power savings at the user equipment;
wherein the one or more actions include at least one of the following: deactivating a secondary cell associated with a carrier aggregation configuration; releasing, by a user equipment, a secondary cell associated with the carrier aggregation configuration; releasing a physical uplink control channel configuration; terminating a timing advance timer before expiration of the timing advance timer; releasing a connection; configuring a longer discontinuous receive cycle; configuring a longer measurement cycle; releasing a radio resource control connection; inhibiting one or more measurements performed by the user equipment; inhibiting one or more inter-frequency measurements while continuing one or more intra-frequency measurements; inhibiting evaluation by the user equipment of one or more measurement events; inhibiting the user equipment from sending one or more measurement reports to the network; removing at the user equipment one or more measurement objects; deactivating at the user equipment one or more measurement objects; or performing by the user equipment one or more measurements less frequently when compared the user equipment not preferring power savings.

8. An apparatus as in claims 7, wherein the one or more actions at the user equipment are performed at the user equipment, when the indication is sent.

9. An apparatus as in claims 7, wherein the network comprises a wireless network including a base station.

10. An apparatus as in claims 8, wherein the actions are performed, when the indication is sent, without the user equipment being signaled by the network to perform the one or more actions.

11. An apparatus as in claims 7, wherein the one or more actions include configuring a first time for at least one of a cell search, a hand over delay, and a hand over interruption, wherein the first time is greater than a second time configured for the at least one of the cell search, the hand over delay, and the hand over interruption when there is no preference for the power savings at the user equipment.

12. An apparatus as in claims 7 further comprising:
receiving, from the network, a configuration for the one or more actions.

13. A computer-readable storage medium including code which when executed by at least one processor causes operations comprising:
sending, by a user equipment, an indication to a network, wherein the indication represents whether there is a preference for power savings at the user equipment; and
performing, at the user equipment when the indication is sent, one or more actions to implement power savings at the user equipment;
wherein the one or more actions include at least one of the following: deactivating a secondary cell associated with a carrier aggregation configuration; releasing, by the user equipment, a secondary cell associated with the carrier aggregation configuration; releasing a physical uplink control channel configuration; terminating a timing advance timer before expiration of the timing advance timer; releasing a connection; configuring a longer discontinuous receive cycle; configuring a longer measurement cycle; releasing a radio resource control connection; inhibiting one or more measurements performed by the user equipment; inhibiting one or more inter-frequency measurements while continuing one or more intra-frequency measurements; inhibiting the user equipment from sending one or more measurement reports to the network; removing at the user equipment one or more measurement objects; deactivating at the user equipment one or more measurement objects; or performing by the user equipment one or more measurements less frequently when compared the user equipment not preferring power savings.

14. A computer-readable storage as in claims 13, wherein the one or more actions at the user equipment are performed at the user equipment, when the indication is sent.

15. A computer-readable storage as in claims 13, wherein the network comprises a wireless network including a base station.

16. A computer-readable storage as in claims 14, wherein the one or more actions are performed, when the indication is sent, without the user equipment being signaled by the network to perform the one or more actions.

17. A computer-readable storage as in claims 13, wherein the one or more actions include configuring a first time for at least one of a cell search, a hand over delay, and a hand over interruption, wherein the first time is greater than a second time configured for the at least one of the cell search, the hand over delay, and the hand over interruption when there is no preference for the power savings at the user equipment.

18. A computer-readable storage as in claims 13 further comprising:
   receiving, from the network, a configuration for the one or more actions.

\* \* \* \* \*